No. 676,222. Patented June 11, 1901.
C. E. DREW.
MACHINE FOR DYEING, &c.
(Application filed Aug. 18, 1900.)
(No Model.) 3 Sheets—Sheet 1.
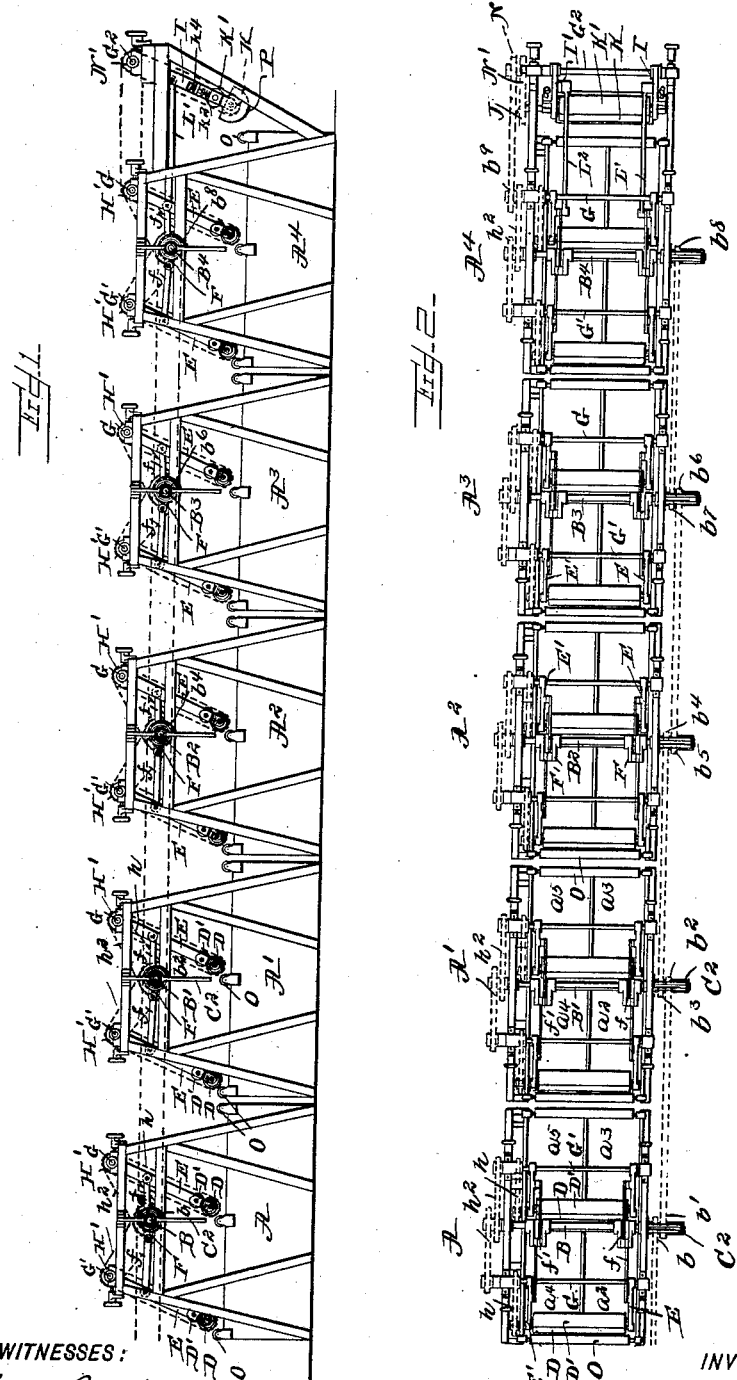
WITNESSES:
Jesse B. Heller
W. M. Hamilton
INVENTOR
Charles E. Drew
BY
Harding & Harding
ATTORNEYS

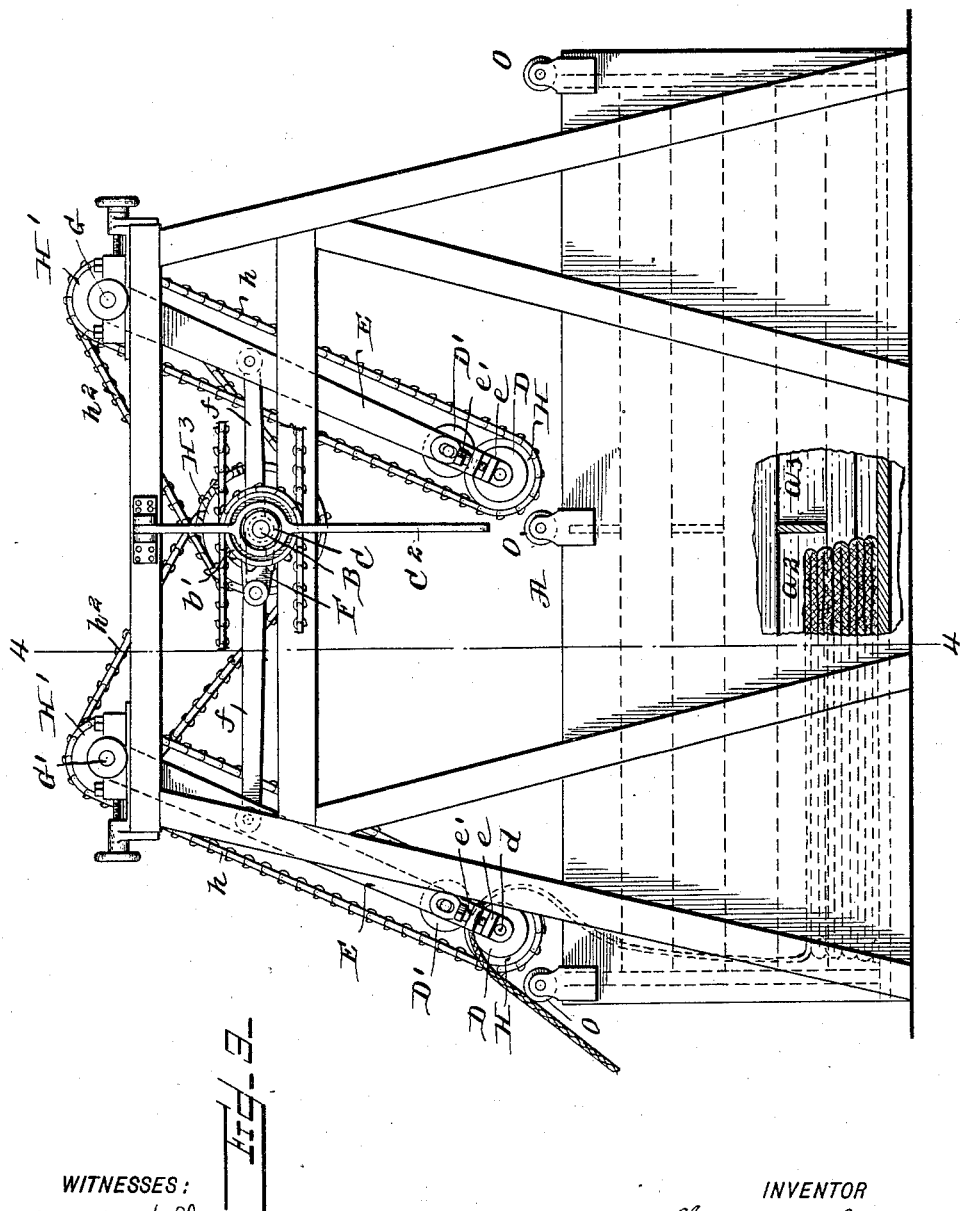

No. 676,222. Patented June 11, 1901.
C. E. DREW.
MACHINE FOR DYEING, &c.
(Application filed Aug. 18, 1900.)
(No Model.) 3 Sheets—Sheet 3.
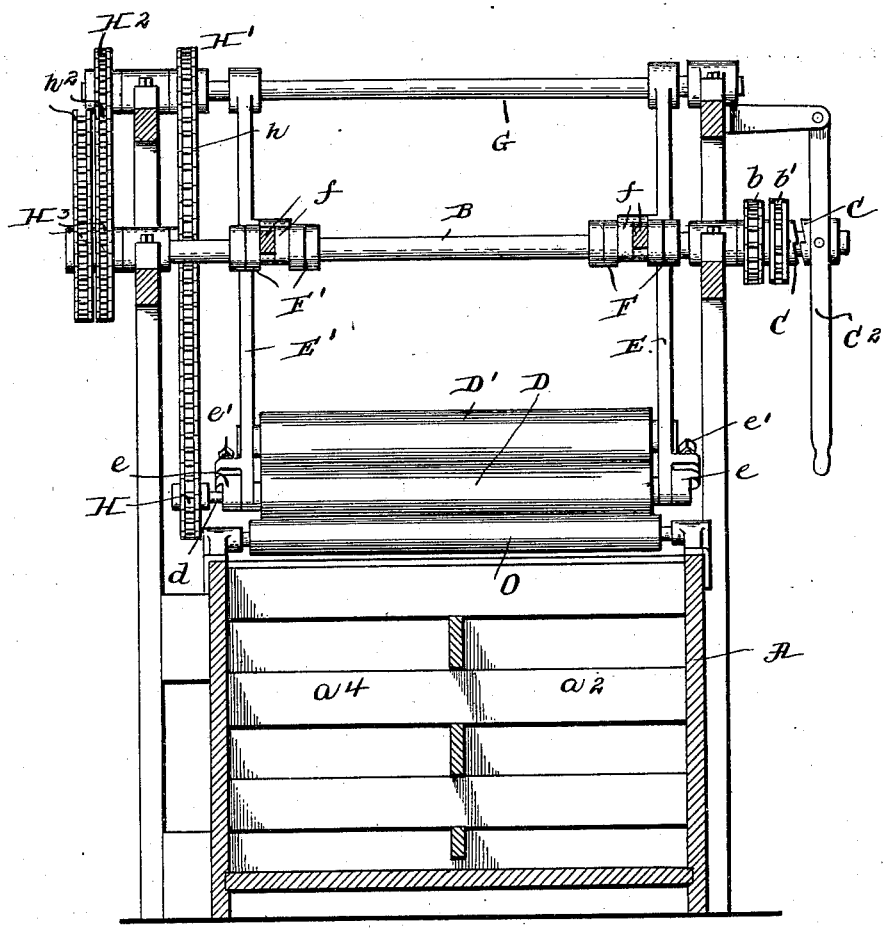
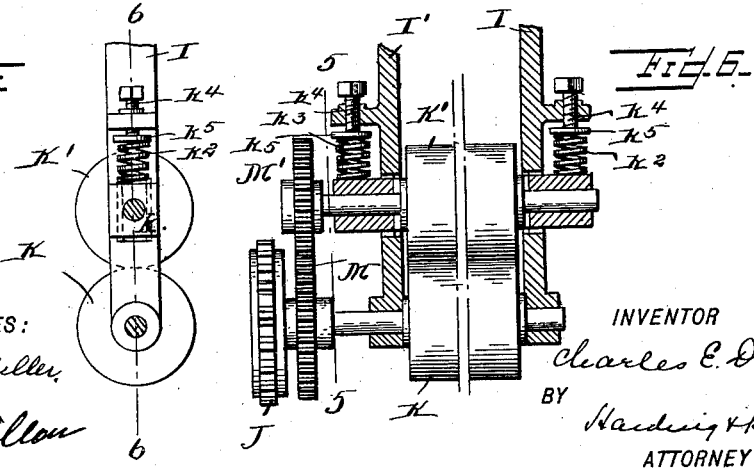
WITNESSES:
INVENTOR
Charles E. Drew
BY
Harding & Harde
ATTORNEYS

UNITED STATES PATENT OFFICE.

CHARLES E. DREW, OF PHILADELPHIA, PENNSYLVANIA, ASSIGNOR OF ONE-HALF TO THE FRIEDBERGER MANUFACTURING COMPANY, OF PENNSYLVANIA.

MACHINE FOR DYEING, &c.

SPECIFICATION forming part of Letters Patent No. 676,222, dated June 11, 1901.

Application filed August 18, 1900. Serial No. 27,356. (No model.)

*To all whom it may concern:*

Be it known that I, CHARLES E. DREW, a citizen of the United States, residing at Philadelphia, county of Philadelphia, and State of Pennsylvania, have invented a new and useful Improvement in Machines for Dyeing, Bleaching, and Scouring, of which the following is a full, clear, and exact description, reference being had to the accompanying drawings, which form a part of this specification.

My invention has for its object the production of a machine in which dyeing, bleaching, scouring, and the like may be carried on and produce a satisfactory result. It consists in certain mechanisms and constructions, hereinafter fully pointed out, by which this result is obtained.

I will first describe the embodiment of my invention illustrated in the accompanying drawings and then particularly point out the invention in the claims.

In the drawings, Figure 1 is a side elevation of a series of tanks embodying my invention. Fig. 2 is a plan view of same. Fig. 3 is a side elevation of one of the tanks with a portion broken away. Fig. 4 is a section on the line 4 4 of Fig. 3. Fig. 5 is a detail sectional view of the wringer on the line 5 5 of Fig. 6. Fig. 6 is a section on line 6 6, Fig. 5.

$A$ $A'$ $A^2$ $A^3$ $A^4$ are a series of tanks. Each one of these tanks is divided laterally and longitudinally by perforated or slatted partitions $a$, forming four compartments $a^2$, $a^3$, $a^4$, and $a^5$ in each tank; but the liquid can pass freely from one compartment to the others.

B to $B^4$ are main driving-shafts, one for each tank and suitably supported and journaled. Loose upon each shaft, but connected with each other, are two sprocket-wheels, those on shaft B being lettered $b$ $b'$; those on shaft $B'$, $b^2$ $b^3$; those on shaft $B^2$, $b^4$ $b^5$; those on shaft $B^3$, $b^6$ $b^7$, and those on shaft $B^4$, $b^8$. From a source of power a sprocket-chain passes to sprocket-wheel $b$, and a chain passes from sprocket-wheel $b'$ to sprocket-wheel $b^2$. Chains connect sprocket-wheels $b^3$ and $b^4$, $b^5$ and $b^6$, and $b^7$ and $b^8$. Thus when the source of power is operated the sprocket-wheels on each shaft B to $B^4$ are rotated. Each shaft B to $B^4$ has a clutch, one member, C, being splined upon the shaft and the other, C', connected with the sprocket-wheels upon that shaft. Each clutch has the operating-lever $C^2$. By operating any one or all of these levers the corresponding shaft or shafts are connected with the sprocket-wheels and the shafts are rotated. At each end of each tank are a pair of rollers D D', the roller D' being loosely journaled at each end in the arms E E'. The shaft $d$ of the roller D is journaled in blocks $e$, connected by screws $e'$ with the arms E and E'. Upon the main shaft of each tank are the cranks F F'. From the crank F links $f$ extend, one to the arm E at one end of the tank and the other to the arm E at the other end of the tank. From the crank F' links $f'$ extend one to the arm E' at one end of the tank and the other to the arm E' at the other end of the tank. These arms E E' at one end of each tank are loosely journaled upon a shaft G, and the arms E and E' at the other end of each tank are loosely journaled upon a shaft G'. Thus when the shafts are rotated, the corresponding arms E' and E are oscillated.

Upon the shaft $d$ is a sprocket-wheel H. A sprocket-chain $h$ connects this wheel H with the sprocket-wheel H' on the shaft G. This shaft is driven by a sprocket-wheel $H^2$ on the same shaft, which in turn is connected by sprocket-chain $h^2$ with the sprocket-wheel $H^3$ on the main shaft. The rollers at the other end of the crank are provided with similar sprocket-driving mechanism. When the main driving-shaft of any of the tanks is rotated, the rollers D and D', front and rear, are rotated with reference to each other and the rollers as a whole given an oscillating movement.

Beyond the tank $A^4$ is a wringer connecting arms I and I', loosely journaled upon a shaft $G^2$. Journaled on the lower end of arms I and I' is the roller K. Above the roller K is the roller K', journaled in blocks $k$ $k'$. Vertically slidably connected to the arms I and I' above the blocks $k$ and $k'$ are respectively the springs $k^2$ $k^3$. Set-screws $k^4$ pass through brackets from the arms I and I' and press against the washer $k^5$ of the springs $k^2$ and $k^3$. By adjusting these set-screws the desired pressure between the rollers K and K' may be obtained. These arms I and I' are given an oscillating motion by means of links L L', which connect, respectively, the rear arms E and E' of tank $A^4$ with the arms I and I'. The rollers K and K' are given a rotary movement, as follows: The shafts of the rollers K and K' are geared together by the gears M M'. On the shaft of roller K is the sprocket-wheel J. A sprocket-chain connects this sprocket-wheel with a sprocket-wheel N' on shaft $G^2$. On this shaft $G^2$ is a sprocket-wheel $N^2$, connected by a sprocket-chain with the sprocket-wheel $b^9$ on the shaft G of the tank $A^4$. Below the rollers K and K' is a pan P, connected to the arms I and I', so that any liquid or dripping from the goods may be caught and conveyed to the desired point.

Taking the apparatus, the tanks are filled with the various liquids at the proper temperature necessary for the desired operation of dyeing, bleaching, or scouring, as the case may be. The goods to be treated are first placed between the front rollers D and D' of the tank A, and the shaft B being connected will rotate. This will cause the goods to be fed into the compartment $a^2$ of this tank and laid regularly in the tank. (See Figs. 3 and 4.) The roller O acts as a guide-roller. After all of the goods have been passed into this compartment the last end of the goods is passed between the rear set of rollers D D' of the tank A and passed in the same manner into the compartment $a^3$. The last end of the goods is then passed between the front rollers D and D' of tank A' and its shaft B' made operative, and the same operation takes place in tank A', and so on throughout the tanks. By this operation the goods are in each tank subjected to equal action, for while in compartment $a^2$ the first part of the goods is the longest and the last part the shortest in the liquid, in compartment $a^3$ the duration in the liquid of these parts of the goods is reversed, so that all parts of the goods are subjected substantially to an equal amount of action of the liquid. While the tanks are shown as divided longitudinally into two compartments, they may be divided into any number necessary. The purpose of dividing the tanks laterally into two compartments is to enable simultaneously two pieces of goods to be acted on, one in compartments $a^2$ and $a^3$ and the other in compartments $a^4$ and $a^5$. Of course the tanks could be divided laterally into more compartments. By this construction the goods are automatically fed into the tanks and regularly laid thereon from tank to tank and given throughout an equal operation in each tank. After passing through the tank $A^4$ the goods are fed between the rollers K K', which may be adjusted to the desired position with reference to each other and the liquid squeezed out and the goods regularly laid.

Having now fully described my invention, what I claim, and desire to protect by Letters Patent, is—

1. In a machine of the character described, in combination with a tank adapted to hold liquid of a pair of rollers between which the material to be treated is adapted to pass, said rollers being supported so as to be adapted to oscillate together, means to oscillate said rollers and means to rotate said rollers independently of their oscillating movement, whereby the material to be treated is fed between said rollers in their rotation and distributed in the tank by their oscillation.

2. In a machine of the character described, in combination with a tank adapted to hold liquid divided longitudinally, a pair of rollers extending across said tank, said rollers being supported so as to be adapted to oscillate together, means to oscillate said rollers, and means to rotate said rollers independently of their oscillatory movement.

3. In a machine of the character described, in combination with a tank adapted to hold liquid divided transversely into a plurality of compartments, a pair of rollers for each compartment, each pair of rollers being supported so as to be adapted to oscillate together, and means to oscillate each pair of rollers, and means to rotate each pair of rollers independently of their oscillatory movement.

4. In a machine of the character described, in combination with a tank adapted to hold liquid divided transversely into a plurality of compartments, a pair of rollers for each compartment, each pair of rollers being supported so as to be adapted to oscillate together, means to simultaneously oscillate both pairs of rollers, and means to rotate each pair of rollers independently of their oscillatory movement.

5. In a machine of the character described, in combination with a tank adapted to hold liquid divided longitudinally and transversely, a pair of rollers for each transverse division of each pair of rollers being supported so as to be adapted to oscillate together, means to rotate each pair of rollers and means to oscillate each pair of rollers.

6. In a machine of the character described, in combination with a tank adapted to hold liquid divided longitudinally and transversely, a pair of rollers for each transverse division, each pair of rollers being supported so as to be adapted to oscillate together, means to rotate each pair of rollers, and means to simultaneously oscillate both pairs of rollers.

7. In combination with a tank adapted to hold liquid, a pair of rollers between which the material to be treated is adapted to pass, supported so as to be adapted to oscillate, and means to oscillate said rollers together and means to rotate said rollers independently of their oscillation, whereby the material to be treated is fed between said rollers in their rotation and distributed by their oscillation.

8. In combination with a tank adapted to hold liquid, a pair of rollers, supported so as to be adapted to oscillate, and means to oscillate said rollers together, means to rotate said rollers independently of their oscillation, and means to vary the tension between said rollers.

9. In a machine of the character described, in combination with a tank adapted to hold liquid, a pair of rollers between which the material to be treated is adapted to pass, pivoted arms in which rollers are journaled, and means to oscillate said arms, means to rotate said rollers independently of the oscillation of said arms whereby the material to be treated is fed between said rollers in their rotation and distributed by their oscillation.

10. In a machine of the character described, in combination with a tank adapted to hold liquid, a pair of rollers, pivoted arms in which rollers are journaled, a driving-shaft, cranks upon said shaft and connection between said cranks and said pivoted arms and means to rotate said rollers from said shaft independently of the connection between said shaft and the pivoted arm.

11. In a machine of the character described, in combination with a tank, divided transversely, a pair of rollers, for each transverse division, pivoted arms for each pair of rollers and in which said rollers are journaled, a driving-shaft, cranks upon said shaft and connections between said cranks and the corresponding arms of each pair of rollers and means to rotate said rollers from the driving-shaft.

12. In a machine of the character described, in combination with a plurality of tanks, a driving-shaft for each tank, driving mechanism loose upon each shaft, the driving mechanism of the shafts being interconnected and a clutch for each shaft adapted to connect the driving mechanism and its corresponding shaft, a pair of rollers in each tank, said rollers being supported so as to be adapted to oscillate and mechanism connecting said rollers and shaft whereby the rollers are rotated from and together oscillated by the rotation of said shaft.

13. In a machine of the character described, in combination with a plurality of tanks, a driving-shaft for each tank, driving mechanism loose upon each shaft, the driving mechanism of the shafts being interconnected and a clutch for each shaft adapted to connect the driving mechanism and its corresponding shaft, a pair of rollers in each tank, pivoted arms to which said rollers are journaled, cranks upon each shaft and connection between said cranks and said arms and means to rotate said rollers from said shaft.

14. In a machine of the character described, in combination with a plurality of tanks, a driving-shaft for each tank, driving mechanism loose upon each shaft, the driving mechanism of the shafts being interconnected and a clutch for each shaft adapted to connect the driving mechanism and its corresponding shaft, a plurality of pairs of rollers, in each tank, pivoted drums for each pair of rollers in which said rollers are journaled, cranks upon said shaft and connection between said cranks and corresponding arms and means to rotate said rollers from said shaft.

In testimony of which invention I have hereunto set my hand at Philadelphia on this 16th day of August, 1900.

CHAS. E. DREW.

Witnesses:
CHAS. COBB VAN RIPER,
M. M. HAMILTON.